（12）United States Patent
Son et al.

(10) Patent No.: US 9,078,079 B2
(45) Date of Patent: Jul. 7, 2015

(54) MULTI-NETWORK ACCESS METHOD AND COMMUNICATION DEVICE THEREOF

(75) Inventors: JuHyung Son, Gyeonggi-Do (KR); Hangdong Seong, Seoul (KR); Husoon Choi, Seoul (KR); Jinho Sohn, Gyeonggi-Do (KR); Jiyoung Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/578,783

(22) PCT Filed: Nov. 23, 2011

(86) PCT No.: PCT/KR2011/008973
§ 371 (c)(1),
(2), (4) Date: Aug. 13, 2012

(87) PCT Pub. No.: WO2013/051754
PCT Pub. Date: Apr. 11, 2013

(65) Prior Publication Data
US 2013/0089027 A1    Apr. 11, 2013

Related U.S. Application Data

(60) Provisional application No. 61/544,937, filed on Oct. 7, 2011.

(51) Int. Cl.
*H04W 4/00* (2009.01)
*H04W 80/02* (2009.01)

(52) U.S. Cl.
CPC ............... *H04W 4/00* (2013.01); *H04W 80/02* (2013.01)

(58) Field of Classification Search
CPC ........ H04W 88/00; H04W 80/00; H04W 4/00
USPC .......... 370/329, 392, 252, 338, 310, 311, 328
See application file for complete search history.

(56) References Cited

U.S. PATENT DOCUMENTS

| 6,631,378 | B1 | 10/2003 | Rosinus et al. | |
| 7,801,555 | B2* | 9/2010 | Jain et al. | 455/552.1 |
| 2006/0259627 | A1 | 11/2006 | Kellerer et al. | |
| 2007/0019672 | A1 | 1/2007 | Guthrie | |
| 2007/0242688 | A1* | 10/2007 | McFarland | 370/445 |
| 2008/0016204 | A1 | 1/2008 | Lai et al. | |

(Continued)

FOREIGN PATENT DOCUMENTS

| CN | 1860766 A | 11/2006 |
| CN | 101268706 A | 9/2008 |
| CN | 102202430 A | 9/2011 |
| JP | 2-29141 A | 1/1990 |
| JP | 11-96106 A | 4/1999 |
| JP | 2000-252986 A | 9/2000 |

(Continued)

*Primary Examiner* — Andrew Lai
*Assistant Examiner* — Sumitra Ganguly
(74) *Attorney, Agent, or Firm* — Birch, Stewart, Kolasch & Birch, LLP

(57) ABSTRACT

In a multiple network access method in a communication device including at least one protocol stack having a physical layer and a medium access control (MAC) layer, and at least one application unit for performing communication through the protocol stack, the method includes applying a first parameter to the protocol stack and a first attribute to the application unit, accessing a first network for a first attribute to the applications, switching the first parameter into a second parameter and the fist attribute into a second attribute, and accessing a second network for a second hour after the switching.

14 Claims, 11 Drawing Sheets

(56) References Cited

U.S. PATENT DOCUMENTS

| | | |
|---|---|---|
| 2008/0056261 A1 | 3/2008 | Osborn et al. |
| 2010/0115048 A1* | 5/2010 | Scahill .......................... 709/213 |
| 2010/0260061 A1* | 10/2010 | Bojahra et al. ................ 370/252 |
| 2010/0321201 A1 | 12/2010 | Huang et al. |
| 2011/0136433 A1* | 6/2011 | Tsai et al. .................... 455/41.2 |
| 2012/0063397 A1* | 3/2012 | Abedi et al. .................. 370/329 |

FOREIGN PATENT DOCUMENTS

| | | |
|---|---|---|
| JP | 2006-54841 A | 2/2006 |
| JP | 2007-515833 A | 6/2007 |
| JP | 2009-146224 A | 7/2009 |
| KR | 10-0726852 B1 | 6/2007 |
| KR | 10-0732315 B1 | 6/2007 |
| KR | 10-2008-0030679 A | 4/2008 |

* cited by examiner (PAN2) : ZigBee Pro (PAN2)

MULTI-NETWORK ACCESS METHOD AND COMMUNICATION DEVICE THEREOF

This application is a National Phase of PCT/KR2011/008973 filed Nov. 23, 2011, which claims priority under 35 U.S.C. 119(e) to the U.S. Provisional Application No. 61/544,937 filed on Oct. 7, 2011, all of which are hereby expressly incorporated by reference into the present application.

TECHNICAL FIELD

The present disclosure relates to a multi-network access method and a communication device thereof.

BACKGROUND ART

A home network system, which is able to control a Personal Computer (PC), peripheral devices, mobile phones, home appliances and the like installed or located within home, via one network, is configured to control every type of digital home appliances, such as a computer, a digital television receiver, a digital video player, an air-conditioner/heater and the like, by accessing a network constructed within the home via an Internet or a telephone line not only inside the system but also outside the system.

A wireless short-range communication technology is used for constructing the home network. Examples of the short-range communication technologies may include Bluetooth, Zigbee, Wireless LAN and the like.

Bluetooth is a wireless Personal Area Network (PAN) access technology, which is currently mounted in the most mobile communication terminals throughout the world. Bluetooth is used not only for audio-related communication services, such as wireless handsfree, stereo music streaming, One phone and the like, but also for data communication services, such as data communication, message exchange and the like between mobile communication terminals.

Bluetooth is increasing its usage range because of allowing free wireless communications among several devices within a relatively narrow area (10~100 m) with low costs and low power.

The use of Zigbee communication is increasing for the purpose of controlling lighting devices existing on a network constructed within a home or office or home appliances such as air-conditions, TV receivers and the like.

The Zigbee communication also has the advantages in the aspect of implementing a wireless device control with low costs and low power, thus to be expected to be widely used for constructing a home network.

FIG. 1 illustrates a home network system.

As illustrated in FIG. 1, a wireless gateway device which can relay wireless LAN/Bluetooth/Zigbee communication is connected to an Access Point (AP) on a home network by a Wireless Distribution System (WDS) function of a wireless LAN, forming a wireless mesh networking on the home network.

The wireless mesh networking, unlike the conventional point-to-point and point-to-multipoint wireless communications, is a technique capable of providing network reliability and a wide wireless network service area even by less output, by virtue of having the same mesh type networking architecture of a wired network even on a wireless network. As illustrated, the wireless mesh network is constructed on a home network by establishing a connection between an AP and a wireless gateway device through the WDS function of the wireless LAN.

Also, FIG. 1 illustrates a home network which allows for data communication among Bluetooth devices, wireless LAN devices and Zigbee devices on a Zigbee communication network installed within home through a wireless gateway device.

In such type of home network, various types of devices within the home can transmit and receive control signals or data via a Zigbee-based communication. The various types of devices may be controlled by a Zigbee remote controller to be connected to one another via an external network, for example, an Internet.

Therefore, a user may control the various types of devices by accessing the various types of devices via the Internet from the outside. This may result in a remarkable increase in user convenience.

Upon constructing the home network using Zigbee as the short-range communication technology, a wireless network may be constructed more easily. Also, other communication devices except for the AP within the home network are not required for the wired connection except for power supply, which facilitates constructing of the home network.

FIG. 2 illustrates a connected relation of Zigbee communication.

As can be noticed with reference to FIG. 2, a plurality of devices 11 and 12 belong to a first network, a plurality of devices 21 to 24 belong to a second network and a plurality of devices 32 and 33 belong to a third network. The first to third networks may be PANs. Each PAN may be generated by a coordinator and formed as the plurality of devices participate in each PAN. Each PAN uses a unique identifier and channel, accordingly, a plurality of PANs may coexist on the same space.

For example, the devices belonging to the first network may be devices for home appliances, for example, a washing machine, a refrigerator and the like. The devices belonging to the second network may be devices for home entertainment, for example, TV, media player and the like. Also, the devices belonging to the third network may be user's portable devices, for example, a cellular phone, a tablet and the like.

Here, a first node 10 has to be connectable with the first, second and third networks, respectively.

However, the related art has not proposed any approach to communicate with a plurality of networks using the Zigbee technology. Especially, the Zigbee technology defined in the related art has merely focused on researches for low power and size reduction, without studying an approach for connection to a plurality of networks.

DISCLOSURE OF THE INVENTION

Therefore, this specification aims at providing approaches for obviating those problems.

In detail, an aspect of this specification is to allow a short-range communication device to access a plurality of networks, in more detail, to provide architecture for allowing a short-range communication device to access a plurality of networks, and a method thereof.

To achieve these and other advantages and in accordance with the purpose of the present invention, as embodied and broadly described herein, there is provided a time division multiple network access method, from the perspective of a communication device including at least one protocol stack having a physical layer and a medium access control (MAC) layer, and at least one application unit for performing communication through the protocol stack, the method including applying a first parameter to the protocol stack and a first attribute to the application unit, accessing a first network for a first hour after the applications, switching the first parameter into a second parameter and the first attribute into a second attribute, and accessing a second network for a second hour after the switching.

The protocol stack and the application unit may be provided in the device in plurality.

Here, as an example, a first protocol stack of the plurality of protocol stacks may be used to access the first network, and a second protocol stack thereof may be used to access the second network. Also, a first application unit of the plurality of application units may be used to access the first network and a second application unit thereof may be used to access the second network.

As an example, the applying step may be performed to apply the first parameter to the first protocol stack of the plurality of protocol stacks and the first attribute to the second application unit of the plurality of application units.

As an example, the switching step may include applying the second parameter to a second protocol stack of the plurality of protocol stacks and the second attribute to the second application unit of the plurality of application units, and switching the use of the first protocol stack and the second application unit into the use of the second protocol stack and the second application unit.

The method may further include switching the second attribute into a third attribute with respect to the application unit, with maintaining the second parameter for the protocol stack, and accessing a third network for a third hour after the switching.

The method may further include switching the second parameter into a third parameter with respect to the protocol stack, with maintaining the second attribute for the application unit, and accessing a third network for a third hour after the switching.

The switching may be performed according to a preset time period, or upon a generation of a user event or an event within the device.

In accordance with another exemplary embodiment of the present disclosure, there is provided a communication device.

The communication device may include at least one protocol stack having a physical layer and a medium access control (MAC) layer, at least one application unit to perform communication through the protocol stack, and a controller to manage the protocol stack and the application unit. The controller may access a first network for a first hour by applying a first parameter to the protocol stack and a first attribute to the application unit, and thereafter access a second network for a second hour by switching the first parameter into a second parameter and the first attribute into a second attribute.

The protocol stack and the application unit may be provided in the communication device in plurality.

A first protocol stack of the plurality of protocol stacks may be used to access the first network, and a second protocol stack thereof may be used to access the second network. A first application unit of the plurality of application units may be used to access the first network and a second application unit thereof may be used to access the second network.

Advantageous Effect

In accordance with the detailed description, those problems of the related art may be overcome.

In detail, according to the present description, a short-range communication device, such as a Zigbee communication, may be able to access a plurality of networks.

MODES FOR CARRYING OUT THE PREFERRED EMBODIMENTS

Figure 1:
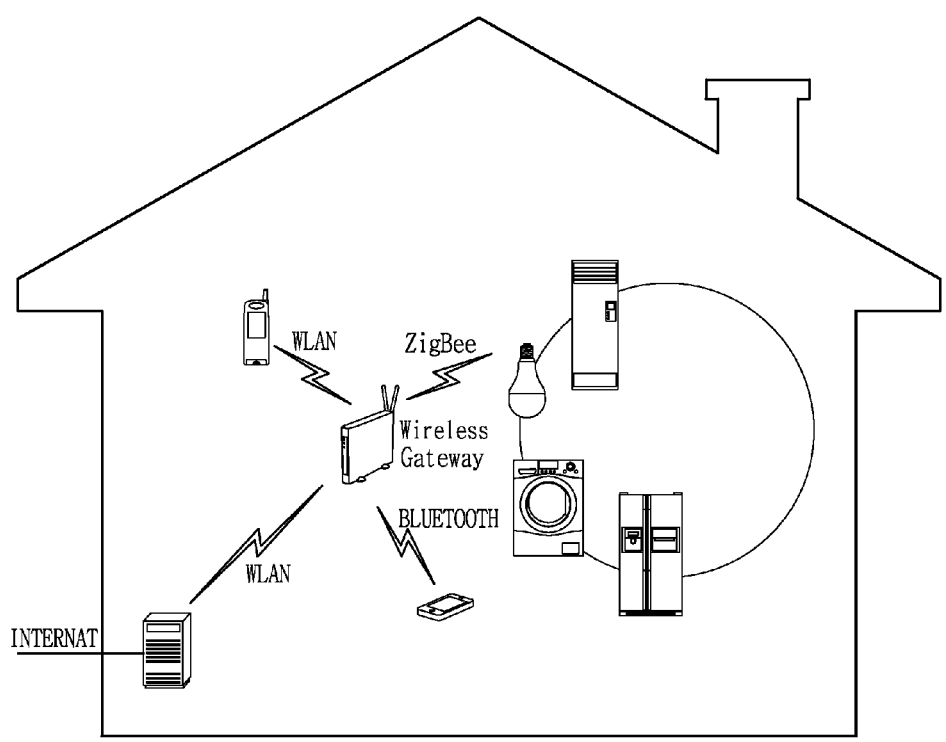
FIG. 1 is a view illustrating a home network system.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

Hereinafter, suffixes "module" and "unit or portion" for components used herein in description are merely provided only for facilitation of preparing this specification, and thus they are not granted a specific meaning or function.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Embodiments of the present invention will be described below in detail with reference to the accompanying drawings, where those components are rendered the same reference number that are the same or are in correspondence, regardless of the figure number, and redundant explanations are omitted.

In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings.

Hereinafter, prior to explaining the exemplary embodiments of the present disclosure with reference to the accompanying drawings, those exemplary embodiments of the present disclosure will be briefly described. Zigbee as a type of short-range wireless communication technology allows short-range communication with low power. The Zigbee technology enables size reduction of a device. To this end, complexity of the communication technology has been removed. However, with the short-range wireless communication technology covering even general devices in recent time, the Zigbee communication is required for various purposes. Especially, the need of the Zigbee communication for accessing multiple networks has grown. To this end, the exemplary embodiments of the present disclosure illustrate in detail an architecture for allowing an access to multiple networks and a method thereof.

Figure 3:
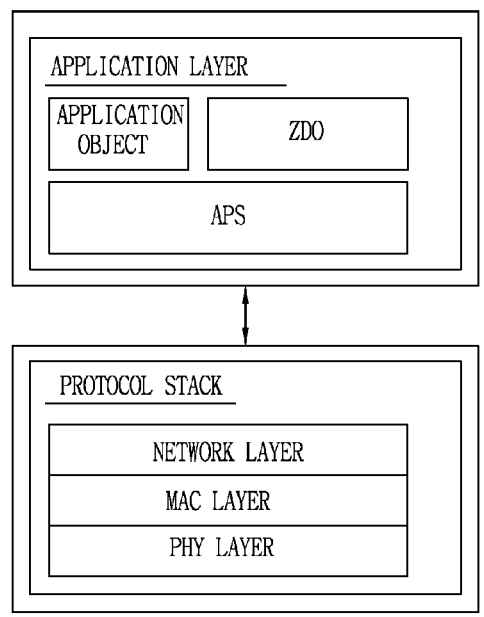
FIG. 3 is a view illustrating a configuration of a Zigbee device.
Figure 4:
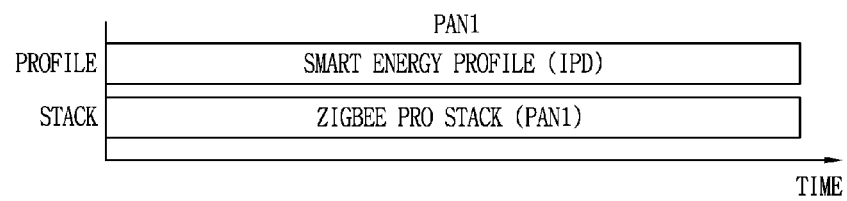
FIG. 4 is a view illustrating an operation of the Zigbee device illustrated in FIG. 3.

FIG. 3 illustrates a configuration of a Zigbee device, and FIG. 4 illustrates an operation of the Zigbee device illustrated in FIG. 3.

Referring to FIG. 3, a Zigbee device may include a protocol stack and an application layer. The protocol stack includes a Physical (PHY) layer, a Medium Access Control (MAC) layer, a NETWORK (NWK) layer.

The PHY layer and the MAC layer are implemented according to "IEEE 802.15.4" standards as standards for the PHY and MAC layers of a Low Rate-Wireless PAN (LR-WPAN).

The network layer is implemented according to standards defined by the Zigbee Alliance. The network layer may manage networking, security, routing and the like.

The application layer includes an Application Support Sub-layer (APS), a Zigbee Device Object (ZDO), and an application object.

The APS has a function of maintaining tables for binding. Here, the binding is an improved monitoring and controlling function of a Zigbee coordinator by allowing the Zigbee coordinator to recognize a connection between devices on a network. The APS services an operation of transferring messages between connected devices, and supports a discovery operation for recognizing a device address and a service and a security management in the APS layer.

The application layer includes application profiles. The application profiles may define device types for implementing various application services, such as home automation, building automation, smart energy management and the like, and accordingly include corresponding commands and attributes. As such, a different application profile may be applied based on whether it is for the home automation or the building automation. Therefore, an operation of the application layer may depend on which type of application profile is applied. However, in the current Zigbee standards, only one application profile may be driven within one chip and it is impossible to drive plural profiles at once.

In the meantime, the Zigbee technology is segmented into Zigbee Pro, Zigbee RF4CE, Zigbee IP and the like. The Zigbee Pro is a technology with more advanced addressing, routing, security and the like than Zigbee. The Zigbee RF4CE is different from Zigbee or Zigbee Pro in the aspect of supporting only one-to-one or one-to-many communication and not supporting a mesh topology. For the segmented technologies, dedicated protocol stacks are required, respectively. Without a dedicated protocol stack, participation in a network operating according to a corresponding technology is unable. Meanwhile, an implementation of the plural dedicated protocol stacks within one device may increase complexity. Also, the Zigbee standards are currently defining that one protocol stack is implemented within a single Zigbee chipset and simultaneous driving of plural protocol stacks is not allowed.

Referring to FIG. 4, a communication device accesses a PAN1 by a protocol stack for the Zigbee Pro and an application profile for smart energy. Here, the communication device may communicate with an In-Premise Display (IPD), namely, a display device, which outputs information related to an amount of power consumed at home and pricing and the like.

Thus, since the communication device uses only one protocol stack and only one application profile according to the current Zigbee standards, it may be able to participate only in the PAN1 but unable to use other protocol stacks or participate in other networks using different application profiles.

Therefore, description will be given hereinafter of architecture for allowing a communication device to access multiple networks and an operation method thereof with reference to FIG. 5.

Figure 5:
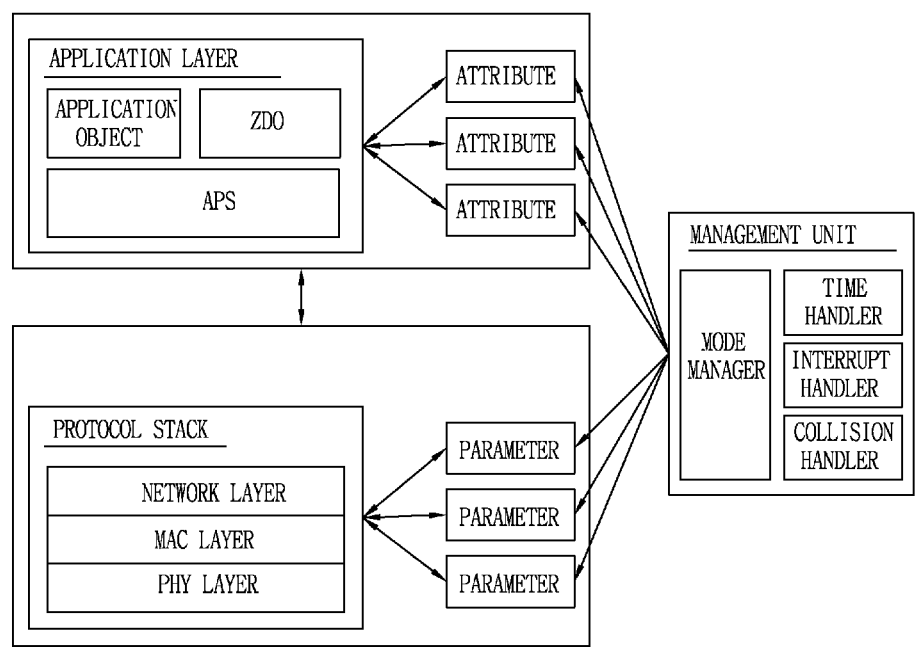
FIG. 5 is a view illustrating an architecture of a communication device in accordance with one exemplary embodiment of this specification.

FIG. 5 is a view illustrating architecture of a communication device in accordance with one exemplary embodiment of this specification.

Referring to FIG. 5, in accordance with one exemplary embodiment, a communication device may include a protocol stack, an application layer, and a management unit.

Also, a plurality of parameters may be applied to the protocol stack, and a plurality of attributes may be applied to the application layer. The management unit may manage applications of the parameters or attributes.

Each of the parameters may allow the protocol stack to operate for Zigbee, Zigbee Pro, Zigbee RF4CE, Zigbee IP and the like. Also, each of the attributes may allow the application layer to operate according to application profiles, such as home automation, building automation, smart energy management and the like.

The management unit may include a mode manager, a time handler, an interrupt handler and a collision handler. The mode manager may apply the parameter and the attribute to the protocol stack and the application layer or switch the parameter and attribute, according to a network to be accessed or a required operation. The time handler may handle the application or switching of the parameter and the attribute on the time-basis. For example, the time handler may allow for the application or switching by one time slot unit or every a predetermined period. The interrupt handler may handle interruption due to event generation when such event is generated by another module within the communication device or a user interface after the parameter and the attribute are applied, and switch the parameter and attribute to another parameter and attribute, thus to allow for operation of the communication device. The interrupt handler may take over a management authority from the time handler when an event is generated during the management of the time handler in a time unit, thereby instructing the mode manager to start a specific mode. The collision handler may handle a collision when such collision occurs during communication.

Figure 6:
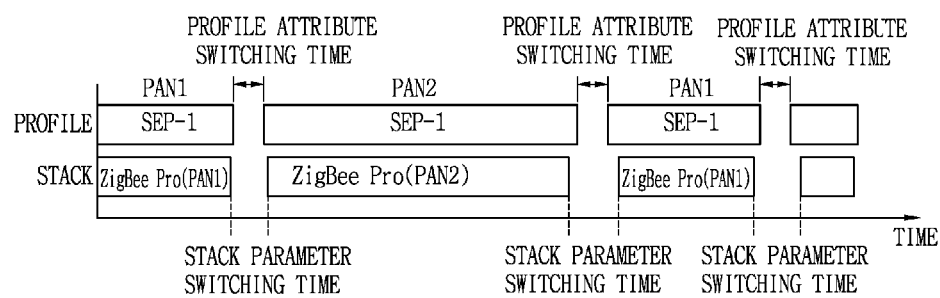
FIG. 6 is an exemplary view illustrating an operation according to the architecture illustrated in FIG. 5.

FIG. 6 is an exemplary view illustrating an operation according to the architecture illustrated in FIG. 5.

An operation of the communication device on a time axis is illustrated in FIG. 6. The architecture illustrated in FIG. 5 includes only one protocol stack and only one application layer but includes the plurality of parameters and attributes. Therefore, the communication device may access a plurality of networks by applying the respective parameters and attributes through a time division as illustrated in FIG. 6.

First, to access a first network, a parameter for Zigbee Pro is applied to the protocol stack of the communication device and an attribute for a Smart Energy Profile (i.e., SEP-1) is applied to the application profile. The communication then accesses the PAN1.

Afterwards, when PAN2 has to be accessed in response to a request from the time handler or the interrupt handler, the mode manager applies SEP-1 to the application profile and a parameter for the Zigbee Pro to the protocol stack. Accordingly, the communication device accesses the PAN2. Here, when the parameter and attribute for the PAN1 are the same as the parameter and attribute for the access to the PAN2, the mode manager may not execute switching of the parameter and attribute. In this case, the communication device may access the PAN2 after the illustrated switching time.

After then, when the PAN1 has to be accessed again in response to the request from the time handler or the interrupt handler, the mode manager may switch the parameter and the attribute for the illustrated switching time.

In the meantime, as illustrated, the profile attribute switching time and the stack parameter switching time may be different from each other. That is, as illustrated, the profile attribute switching time may be shorter than the stack parameter switching time.

Figure 7:
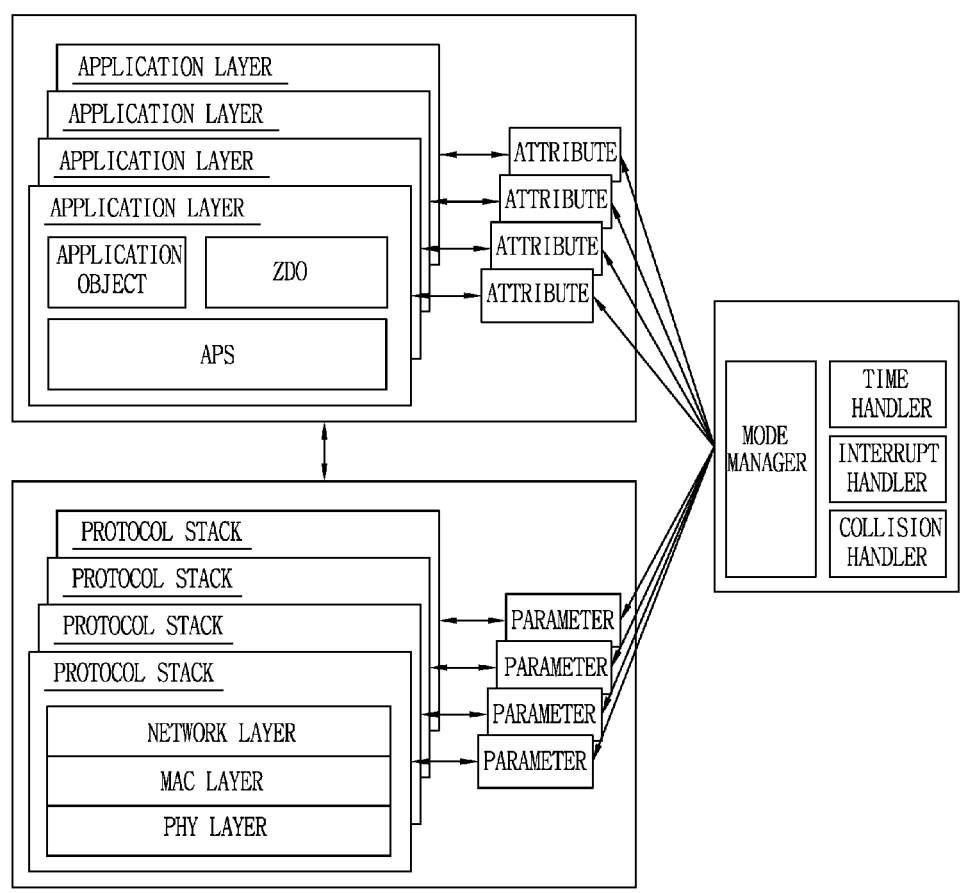
FIG. 7 is a view illustrating an architecture of a communication device in accordance with another exemplary embodiment of this specification.

FIG. 7 is a view illustrating architecture of a communication device in accordance with another exemplary embodiment of this specification.

As illustrated in FIG. 7, a communication device may include a plurality of protocol stacks, a plurality of application layers and a management unit.

Also, parameters may be applied to the corresponding protocol stacks, respectively, and attributes may be applied to the corresponding application layers, respectively. The management unit may manage the applications of the parameters or attributes.

Each parameter may allow the corresponding protocol stack to operate for Zigbee, Zigbee Pro, Zigbee RF4CE, Zigbee IP and the like. Also, each attribute may allow the corresponding application layer to operate according to an application profile, such as home automation, building automation, smart energy management and the like.

The management unit may include a mode manager, a time handler, an interrupt handler and a collision handler. The mode manager may drive a protocol stack corresponding to a necessary parameter and an application profile corresponding to a necessary attribute according to a network to be accessed or a required operation.

Figure 8:
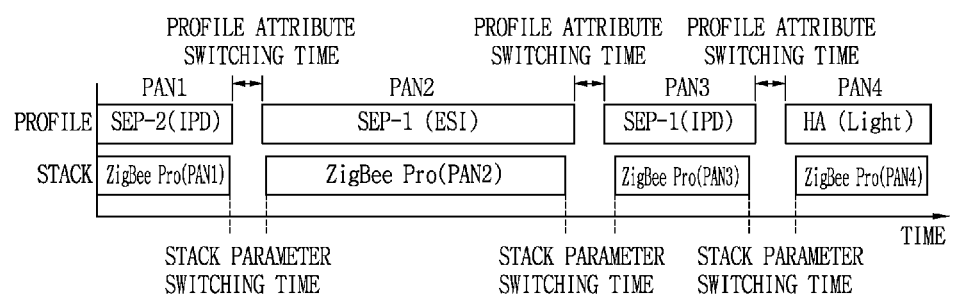
FIG. 8 is an exemplary view illustrating an operation according to the architecture illustrated in FIG. 7.

FIG. 8 is an exemplary view illustrating an operation according to the architecture illustrated in FIG. 7.

An operation of a communication device on a time axis is illustrated in FIG. 8. The architecture illustrated in FIG. 7 has a plurality of protocol stacks and a plurality of application layers. The corresponding parameter is applied to each protocol stack, and the corresponding attribute is applied to each application layer. Therefore, the communication device, as illustrated in FIG. 8, may access each network by driving each protocol stack and application profile through a time division.

First, after a protocol stack having a parameter for Zigbee IP applied thereto is driven and the application layer is driven using a Smart Energy Profile (i.e., SEP-2), the communication device accesses PAN1. Here, the communication device may communicate with an In-Premise Display (IPD), namely, a display device which outputs information related to an amount of power consumed at home and pricing and the like.

When PAN2 has to be accessed in response to a request from the time handler or the interrupt handler, the mode manager switches the protocol stack into another protocol stack, to which a parameter for Zigbee Pro is applied, and the application layer into another application layer, to which SEP-1 is applied. The communication device accesses the PAN2 accordingly. Here, the communication device may communicate with a server using an Energy Service Interface (ESI).

When PAN3 has to be accessed in response to a request from the time handler or the interrupt handler, the mode manager switches the protocol stack into another protocol stack, to which a parameter for Zigbee Pro appropriate for PAN3 is applied, and the application layer into another application layer, to which SEP-1 is applied. The communication device then accesses the PAN3.

Also, when PAN4 has to be accessed in response to a request from the time handler or the interrupt handler, the mode manager switches the protocol stack into another protocol stack, to which a parameter for Zigbee Pro appropriate for PAN4 is applied, and the application layer into another application layer, to which a profile and attribute for home automation is applied. The communication device then accesses the PAN4.

Meanwhile, as illustrated, the profile attribute switching time and the stack parameter switching time may be different from each other. That is, as illustrated, the profile attribute switching time may be shorter than the stack parameter switching time.

Figure 9:
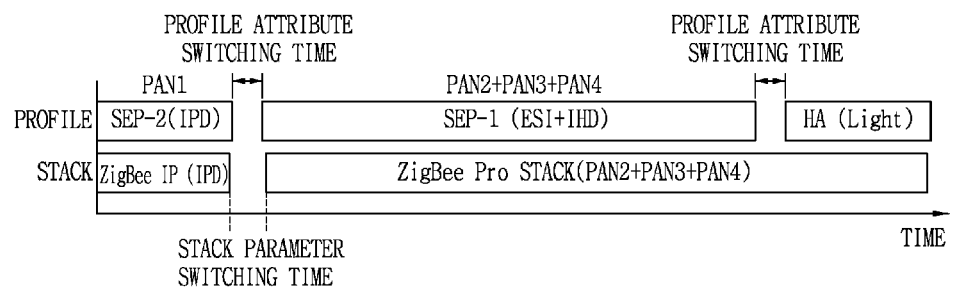
FIG. 9 is another exemplary view illustrating the operation according to the architecture illustrated in FIG. 7.

FIG. 9 is another exemplary view illustrating the operation according to the architecture illustrated in FIG. 7.

As illustrated in FIG. 9, different from FIG. 8, when it is possible to access several networks through protocol stacks having the same parameter applied thereto, switching may not be executed. Similarly, when it is possible to access several networks through application layers having the same profile applied thereto, switching may not be executed. Therefore, as illustrated in FIG. 9, upon accessing each of the several networks, the access is enabled without switching when the same (common) profile or protocol stack allows for the access. Also, the access is enabled by switching only a required portion when a required profile or protocol stack is present.

In detail, the communication device accesses PAN1 after a protocol stack, to which a parameter for Zigbee Pro is applied, is driven and an application layer is driven using a smart energy profile (i.e., SEP-2).

Then, when PAN2 has to be accessed in response to a request from the time handler or the interrupt handler, the mode manager switches the protocol stack into another protocol stack, to which a parameter for Zigbee Pro is applied, and the application layer into another application layer, to which SEP-1 is applied. The communication device accesses the PAN2 accordingly.

Afterwards, when PAN3 has to be accessed, the mode manager accesses PAN3 without a separate switching operation.

When PAN4 has to be accessed, the mode manager switches the application layer into another application layer having the home automation profile applied thereto, with maintaining the protocol stack for accessing the PAN4. The communication device accesses the PAN4 accordingly.

In the meantime, in order to access each PAN with using the common (same) protocol stack or the common application layer, transmitted and received data on each PAN should be sorted within the common protocol stack. In other words, upon accessing PAN2 and PAN3 through the common protocol stack, data on PAN2 and data on PAN3 have to be sorted from each other within the protocol stack. For example, when only one buffer is provided in the common protocol stack, data on PAN2 and data on PAN3 are mixed within the buffer. Therefore, such data should be sorted. To this end, each data within the buffer may be stored together with a PAN ID. Alternatively, even if the common protocol stack is used, buffers may be separately present for each PAN.

The method described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the storage unit and executed by a processor.

Figure 10:
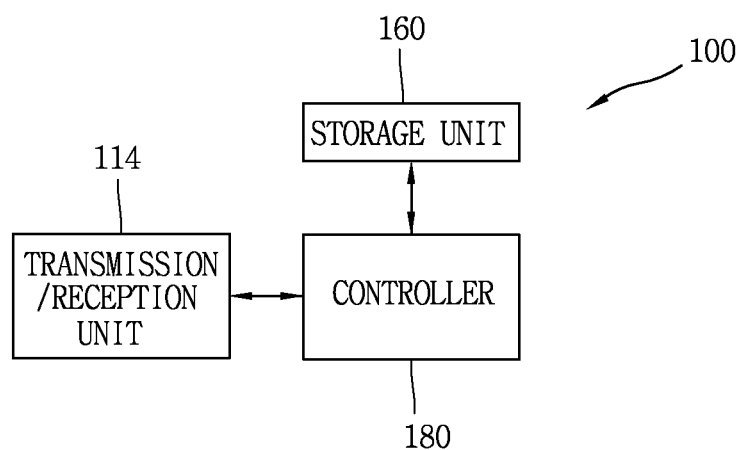
FIG. 10 is a block diagram of a configuration of a communication device according to this specification.

FIG. 10 is a block diagram of a configuration of a communication device according to this specification.

As illustrated in FIG. 10, a communication device 100 according to one exemplary embodiment may include a storage unit 160, a controller 180 and a transmission/reception unit 114. The storage unit 160 may store software or firmware for necessary operations of the communication device 100. The controller 180 may drive the software or firmware. The transmission/reception unit 114 may include the aforementioned architecture. In other words, the transmission/reception unit 114 may include the aforementioned protocol stacks. Here, the aforementioned application layer may be implemented in a firmware form in a storage unit disposed within the transmission/reception unit 114, or in a firmware form in the storage unit 160. In the meantime, the aforementioned management unit may be implemented in a firmware form in a storage unit disposed within the transmission/reception unit 114, or in a firmware form in the storage unit 160.

Figure 11:
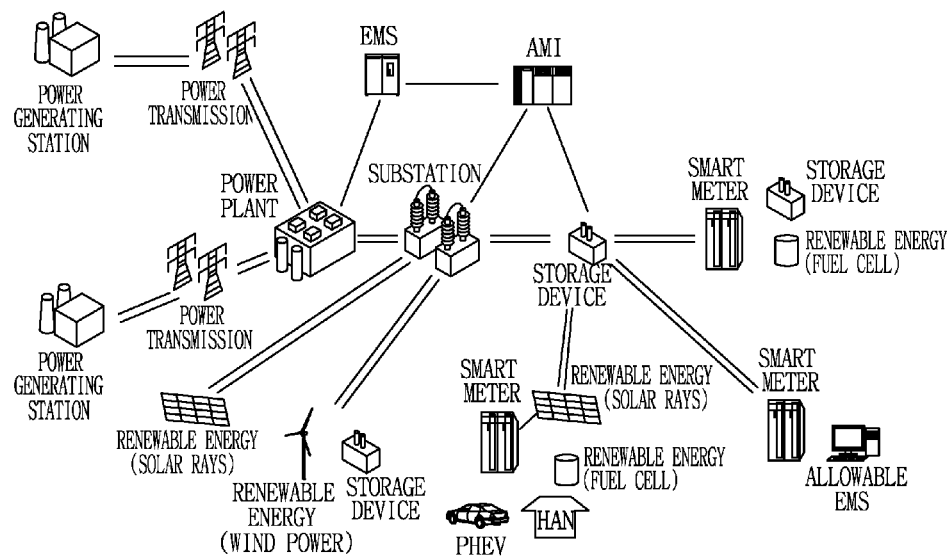
FIG. 11 is a conceptual view of a smart grid.
Figure 12:
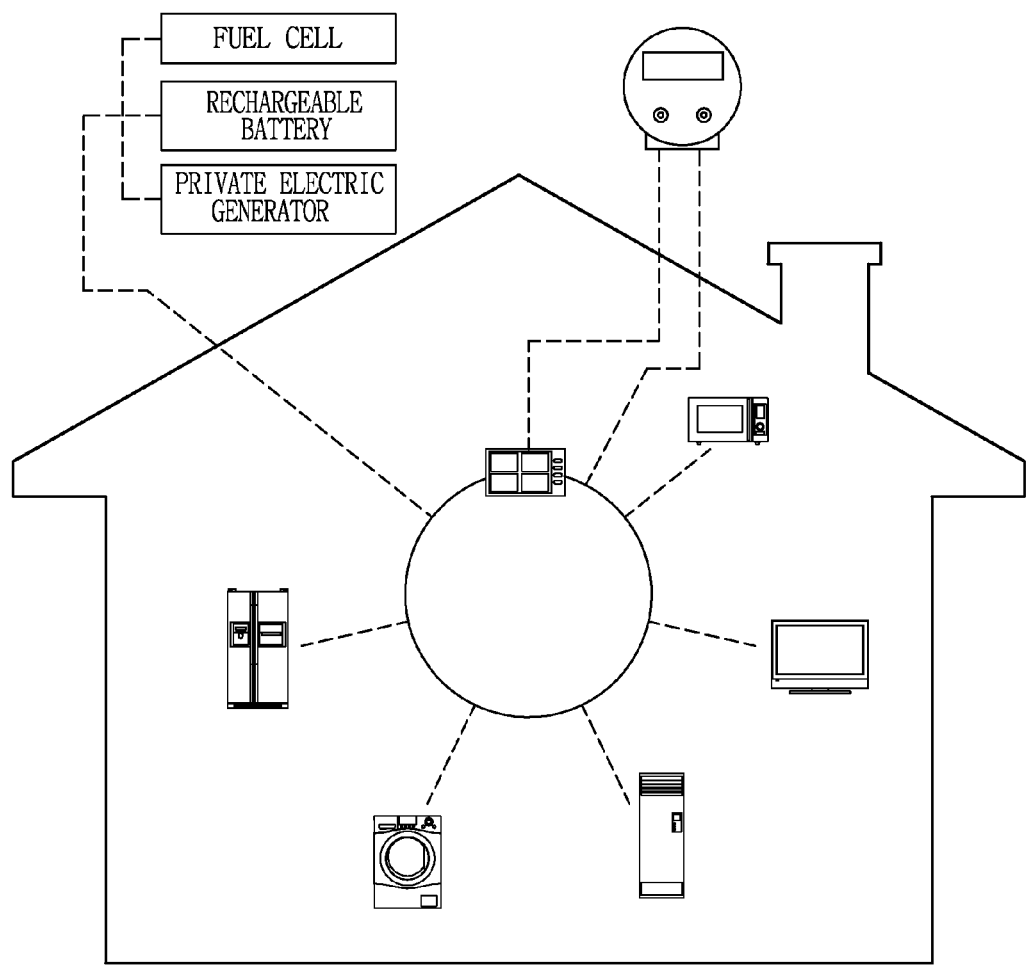
FIG. 12 is a view illustrating an example of using a communication device according to this specification within home as a main consumer of the smart grid.

FIG. 11 is a conceptual view of a smart grid, and FIG. 12 is a view illustrating an example of using a communication device according to this specification within a home as a main consumer of the smart grid.

FIG. 11 is a schematic view of a smart grid. The smart grid may include a power generating station for generating electric power through thermoelectric power generation, nuclear power generation or hydroelectric power generation, and a solar power station and a wind power station using solar rays or wind power as renewable energy.

The thermoelectric power station, the solar power station or the hydroelectric power station may transfer electric power to a power plant via a power transmission line. The power plant may then transfer such electric power to a substation, in which the electric power is distributed to each place to use (consume) the power, such as home or office.

Electric power produced by the renewable energy may also be transferred to the substation to be distributed to each place. Also, electric power transferred to the substation may be distributed to each home or office via a power storage device.

Even in a home using a home power management network (Home Area Network; HAN), electric power may be self-produced by use of solar rays or a fuel cell mounted in Plug in Hybrid Electric Vehicle (PHEV) to supply electric power and re-cell remaining electric power to the exterior.

An office or home is provided with a smart meter so as to recognize power used in each place and electric charges in real time, which may allow a user to recognize the currently consumed power amount and electric charges, finding a solution for reducing the power consumption or electric charges according to situations.

In the meantime, the power generating stations, the power plants, the storage devices and the places to consume the power are allowed for bi-directional communication. Therefore, in addition to one-sided supply of electric power to each place, the situation of each place to use the power may be notified to the power plant or power generating station, to produce and distribute electric power according to the situation of each place.

An Energy Management System (EMS), which manages real-time power for the place to consume power and a real-time prediction of consumed power, and an Advanced Metering Infrastructure (AMI), which measures an amount of consumed power in real time, play important roles in the smart grid.

Here, the metering infrastructure under the smart grid is a base technology for integrating consumers based on an open architecture. The metering infrastructure allows the consumers to efficiently use power and provides a power supplier with a capability of efficiently operating a system by detecting problems on the system.

Here, unlike a typical communication network, the open architecture indicates a reference for interconnection of every electric device, regardless of which manufacturer has manufactured an electric device, in a smart grid system.

Therefore, the metering infrastructure used in the smart grid may enable a consumer-friendly efficiency, such as "Prices to Devices".

That is, a real-time price signal of an electric power market is relayed to an EMS installed in each home. The EMS communicates with each electric device to control it. Hence, a user recognizes electric power information related to each electric device with monitoring the EMS, and performs power information processing, such as setting limits of power consumption or electric charges based on the information, thereby saving energy and costs.

Here, the EMS may preferably include a local EMS used in an office or home, and a central EMS which performs bi-directional communication with the local EMS to process information collected by the local EMS.

Since the smart grid supports real-time communication for electric power information between a supplier and a consumer, "real-time power network reaction" may be realized and accordingly a high cost required to meet a peak demand may be reduced.

In the meantime, referring to FIG. 12, a metering device (smart meter) or EMS 100 for measuring power supplied to each home and electric charges may be installed within a home.

Here, the electric charges may be accounted based on an hour-based pricing. The hour-based electric charges may become more expensive at a time interval in which power consumption drastically increases, or cheaper at a midnight time interval in which relatively less power is consumed.

Here, the EMS or smart meter 100 may include a screen for displaying a current state of power consumption and external environments (temperature, humidity), and be implemented in the form of a terminal having input buttons that a user can manipulate.

The EMS or smart meter 100 may be connected to home appliances, such as a refrigerator, a washing or drying machine, an air-conditioner, TV or cooking devices, by forming a network therewith within a home, performing bidirectional communication.

Also, the EMS or smart meter 100 may be connected to user's portable electronics by forming a network therewith.

As such, the EMS or smart meter 100 may form a plurality of networks, and be accessible to each network. Therefore, the EMS or smart meter 100, as aforementioned, may include a plurality of protocol stacks and a plurality of application layers for allowing access to each network, and be provided with a management unit for managing applications of corresponding parameters and attributes.

In the meantime, auxiliary power sources, namely, a private power station, such as a solar power generating device, and a battery capable of being charged with power generated by the private power station may also be installed within a home. In addition to the battery, a fuel cell may also serve as the auxiliary power source. Here, the auxiliary power source may function of supplying power to home in a state that power is not supplied from an external power source, such as an electric power company.

Figure 13:
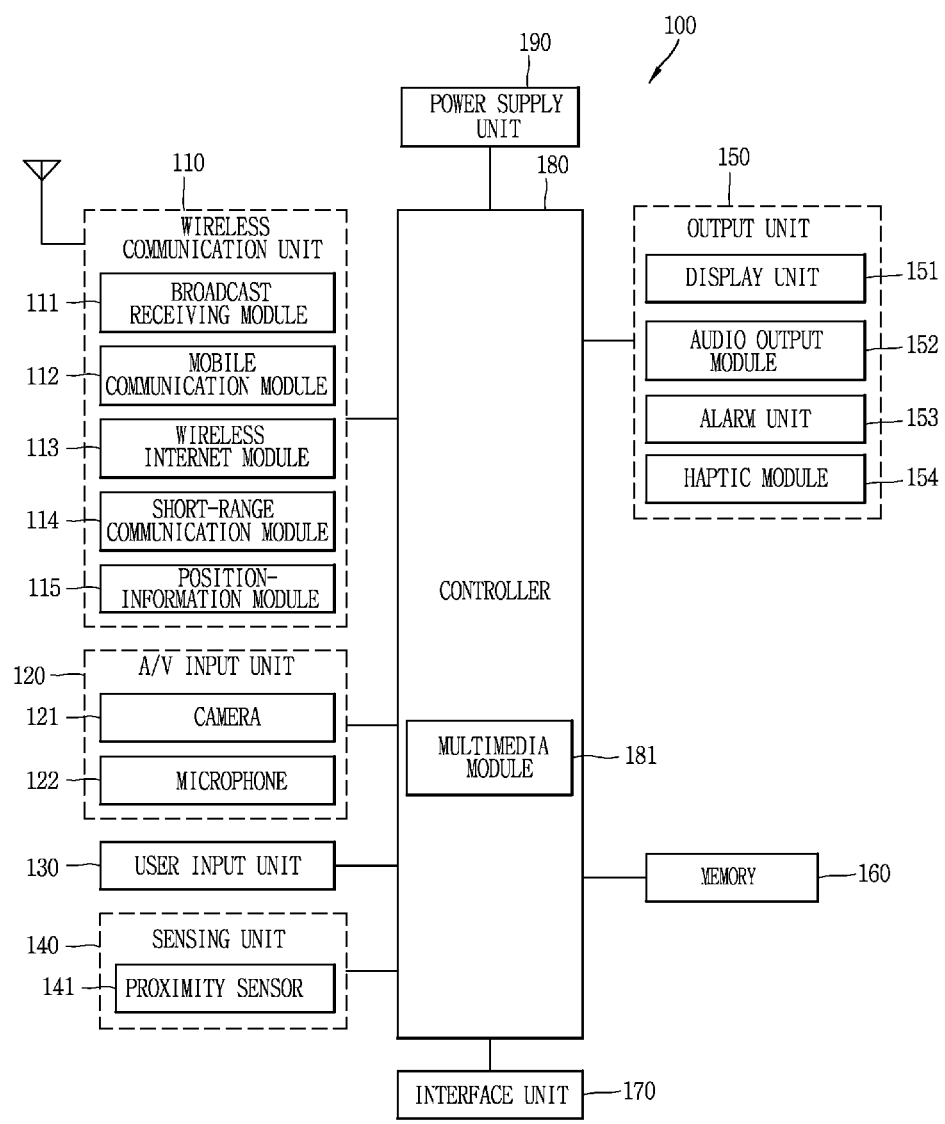
FIG. 13 is a block diagram of a configuration when the communication device according to this specification is implemented as a mobile communication terminal.

FIG. 13 is a block diagram of a configuration when the communication device according to this specification is implemented as a mobile communication terminal.

A communication device 100 implemented as a mobile communication terminal may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, all of the elements as illustrated in FIG. 1 are not necessarily required, and the mobile terminal may be implemented with greater or less number of elements than those illustrated elements.

Hereinafter, the constituent elements will be described in turn.

The wireless communication unit 110 typically includes one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112. Broadcast signals and/or broadcast associated information received via the broadcast receiving module 111 may be stored in a suitable device, such as a memory 160.

The mobile communication module 112 transmits and/or receives a radio signal to and/or from at least one of a base station, an external terminal and a server over a mobile communication network. In this exemplary embodiment, the radio signal may include a voice call signal, a video call signal and/or various types of data according to text and/or multimedia message transmission and/or reception.

The wireless Internet module 113 is a module for supporting wireless Internet access. The wireless Internet module 113 may be built-in or externally installed to the mobile terminal 100. In this exemplary embodiment, the wireless Internet module 113 may use a wireless Internet access technique including a Wireless LAN (WLAN), Wi-Fi, Wireless Broadband (Wibro), World Interoperability for Microwave Access (Wimax), High Speed Downlink Packet Access (HSDPA), and the like.

The short-range communication module 114 is a module for supporting a short-range communication. In this exemplary embodiment, it may be used a short-range communication technology including Bluetooth, Radio Frequency IDentification (RFID), Infrared Data Association (IrDA), Ultra WideBand (UWB), ZigBee, and the like.

The short-range communication module 114 may include an architecture described with reference to FIGS. 3 to 10. In other words, the short-range communication module 114 may include the aforementioned protocol stack. Here, the application layer may be implemented in a firmware form in a storage unit disposed in the short-range communication module 114 or implemented in a firmware form in the memory 160. Also, the aforementioned management unit may be implemented in a firmware form in a storage unit disposed in the short-range communication module 114 or implemented in a firmware form in the memory 160.

The location information module 115 is a module for checking or acquiring a location of the mobile terminal, such as a GPS module.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, existence or non-existence of a user contact, an orientation of the mobile terminal 100 and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, and such displays may be called transparent displays. An example of a typical transparent display may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

In embodiments where the display unit 151 and a touch sensitive sensor (referred to as a touch sensor) have an interlayer structure, the structure may be referred to as a touch screen. The display unit 151 may be used as an input device in addition to being used as an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Figure 2:
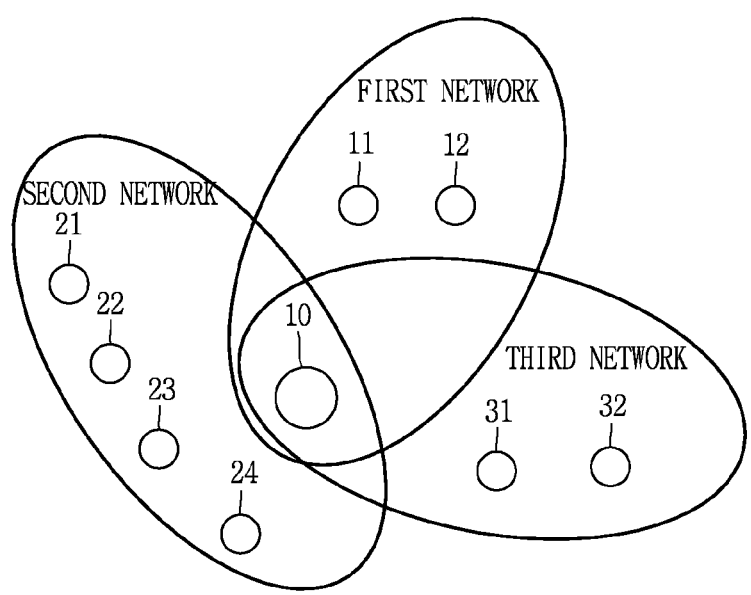
FIG. 2 is a view illustrating a connected relation of Zigbee communication.

Referring to FIG. 2, a proximity sensor 141 may be arranged near the display unit 151. The proximity sensor may sense a presence or absence of an object approaching a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

The audio output module 152 may output audio data received from the wireless communication unit 110 or stored in the memory 160 in a call-receiving mode, a call-placing mode, a recording mode, a voice recognition mode, a broadcast reception mode, and the like. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include a call received, a message received, a key signal input, a touch input, and the like. The alarm unit 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal 100 with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like.

The power supply unit 190 provides power required by various components under the control of the controller 180. The provided power may be internal power, external power, or combination thereof.

The configuration that the electronic device 100 is the mobile communication device has been described herein.

The foregoing embodiments and advantages of the antenna device and a mobile terminal having the same are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A time division multiple network access method of a near field communication device including at least one protocol stack having a physical layer and a medium access control (MAC) layer, and at least one application layer for performing communication through the at least one protocol stack, the time division multiple network access method comprising:

accessing, by the near field communication device, a first network by applying a first parameter to the at least one protocol stack and a first attribute to the at least one application layer;

accessing, by the near field communication device, a second network from the first network by switching the first parameter and the first attribute for accessing the first network into a second parameter and a second attribute for accessing the second network when the first parameter and the first attribute are different from the second parameter and the second attribute; and accessing, by the near field communication device, the second network from the first network based on the first parameter and the first attribute, without switching the first parameter and the first attribute for accessing the first network into the second parameter and the second attribute for accessing the second network, when the first parameter and the first attribute are the same as the second parameter and the second attribute.

2. The method of claim 1, wherein the at least one protocol stack and the at least one application layer are provided in the near field communication device in plurality.

3. The method of claim 2, wherein a first protocol stack of the plurality of protocol stacks is used to access the first network, and a second protocol stack thereof is used to access the second network, and
wherein a first application layer of the plurality of application layers is used to access the first network and a second application layer thereof is used to access the second network.

4. The method of claim 3, wherein the applying step is performed to apply the first parameter to the first protocol stack of the plurality of protocol stacks and the first attribute to the second application layer of the plurality of application layers.

5. The method of claim 3, wherein the switching step comprises:
applying the second parameter to the second protocol stack of the plurality of protocol stacks, and the second attribute to the second application layer of the plurality of application layers; and
switching the use of the first protocol stack and the second application layer into the use of the second protocol stack and the second application layer.

6. The method of claim 3, further comprising:
switching the second attribute into a third attribute with respect to the at least one application layer, along with maintaining the second parameter for the second protocol stack; and
accessing a third network for a third time after the switching the second attribute into the third attribute.

7. The method of claim 1, further comprising:
switching the second parameter into a third parameter with respect to the at least one protocol stack, along with maintaining the second attribute for the at least one application layer; and
accessing a third network for a third time after the switching of the second parameter into the third parameter.

8. A near field communication device comprising:
a storage device configured to store at least one protocol stack having a physical layer and a medium access control (MAC) layer, and at least one application layer processor for performing communication through the at least one protocol stack; and a controller configured to:
  access a first network by applying a first parameter to the at least one protocol stack and a first attribute to the at least one application layer,
  access a second network from the first network by switching the first parameter and the first attribute for accessing the first network into a second parameter and a second attribute for accessing the second network when the first parameter and the first attribute are different from the second parameter and the second attribute, and
  access the second network from the first network based on the first parameter and the first attribute, without switching the first parameter and the first attribute for accessing the first network into the second parameter and the second attribute for accessing the second network, when the first parameter and the first attribute are the same as the second parameter and the second attribute.

9. The device of claim 8, wherein the at least one protocol stack and the at least one application layer are provided in the near field communication device in plurality.

10. The device of claim 9, wherein a first protocol stack of the plurality of protocol stacks is used to access the first network, and a second protocol stack thereof is used to access the second network, and wherein a first application layer of the plurality of application layers is used to access the first network and a second application layer thereof is used to access the second network.

11. The device of claim 10, wherein in performing the applications, the controller applies the first parameter to the first protocol stack of the plurality of protocol stacks and the first attribute to the second application layer of the plurality of application layers.

12. The device of claim 10, wherein in performing the switching, the controller switches the use of the first protocol stack and the second application layer into the use of the second protocol stack and the second application layer after applying the second parameter to the second protocol stack of the plurality of protocol stacks, and the second attribute to the second application layer of the plurality of application layers.

13. The device of 10, wherein the controller accesses a third network for a third time after switching the second attribute into a third attribute with respect to the at least one application layer along with maintaining the second parameter for the second protocol stack.

14. The device of claim 8, wherein the controller accesses a third network for a third time by switching the second parameter into a third parameter with respect to the at least one protocol stack along with maintaining the second attribute for the at least one application layer.

* * * * *